C. MERIWETHER.
METALED END CONCRETE PIPE.
APPLICATION FILED MAR. 28, 1921.
1,401,105.
Patented Dec. 20, 1921.
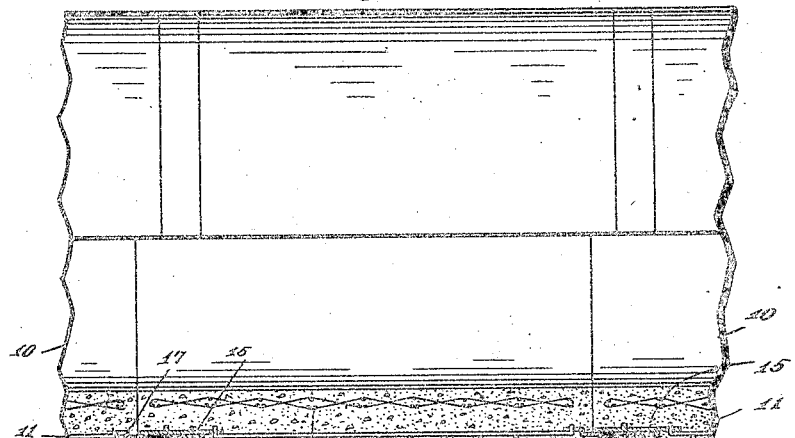
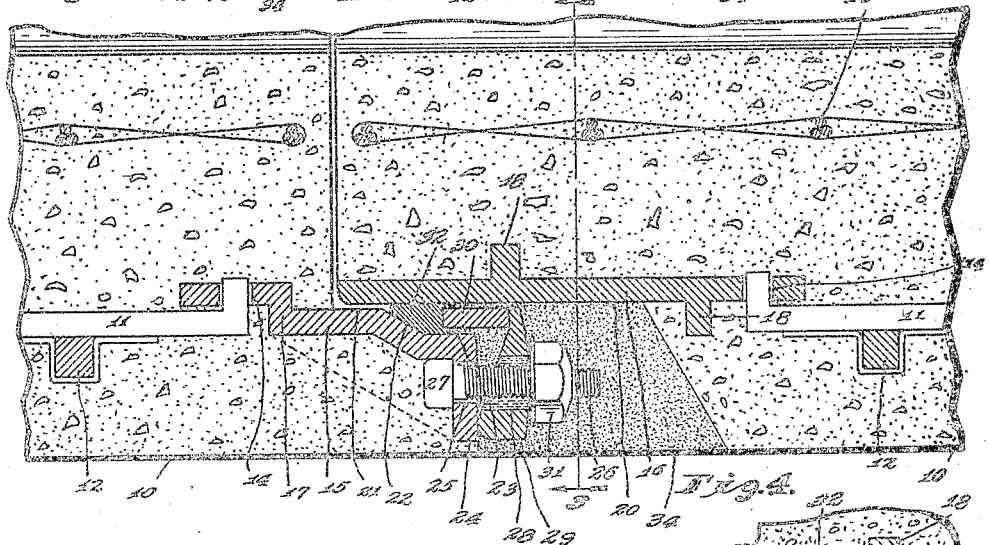
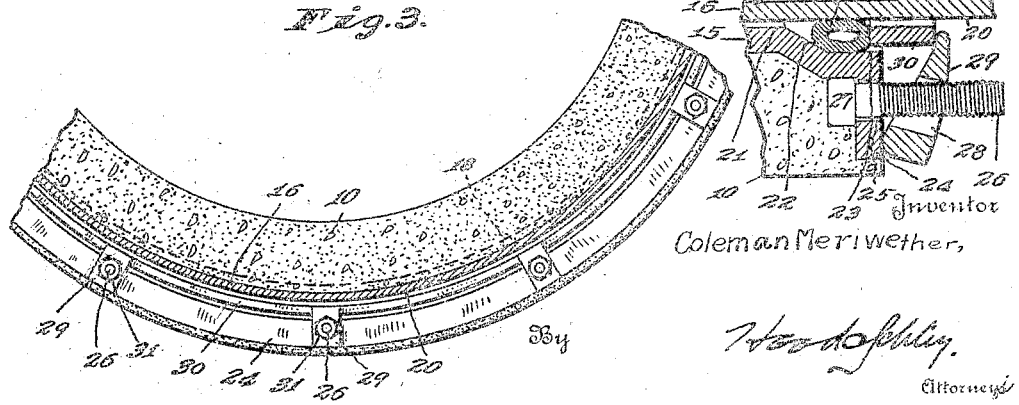
Inventor
Coleman Meriwether,
By
Attorneys

UNITED STATES PATENT OFFICE.

COLEMAN MERIWETHER, OF LOUISVILLE, KENTUCKY, ASSIGNOR TO PETER C. REILLY, OF INDIANAPOLIS, INDIANA.

METALED-END CONCRETE PIPE.

1,401,105.  Specification of Letters Patent.  Patented Dec. 20, 1921.

Application filed March 28, 1921. Serial No. 456,227.

*To all whom it may concern:*

Be it known that I, COLEMAN MERIWETHER, a citizen of the United States, residing at Louisville, in the county of Jefferson and State of Kentucky, have invented a new and useful Metaled-End Concrete Pipe, of which the following is a specification.

It is the object of my invention to produce an efficient joint for reinforced concrete pipe, which joint will be fluid-tight, may be inexpensively produced and installed with unskilled labor, and permits the necessary movement between pipe sections, as required by changes in temperature.

The present invention is in some respects an improvement and development of that shown in my co-pending application, Serial No. 344,613, filed Dec. 13, 1919.

The accompanying drawing illustrates my invention: Figure 1 is a side elevation, in partial vertical section, showing a series of lengths of pipe, with joints embodying my invention; Fig. 2 is a fragmentary axial section on a larger scale; Fig. 3 is a fragmentary transverse section on a scale intermediate between those of Figs. 1 and 2, being taken on the line 3—3 of Fig. 2; and Fig. 4 is a fragmentary sectional detail showing the parts at the packing ring before the latter is compressed.

Each pipe section 10 is made of concrete with longitudinal-reinforcing bars 11 and circumferential reinforcing bars 12, and with such other reinforcement 13 as may be desired, the particular nature of the reinforcement being immaterial; and the ends of the longitudinal reinforcing bars 11 are bent transversely to pass loosely through radial holes 14 in the rings 15 and 16 embedded respectively in the two ends of the section 10, the ring 15 at the bell end and the ring 16 at the spigot end. Both rings 15 and 16 are formed with embedded axially facing surfaces in both directions, formed by the inner end of the ring and by a radial offset 17 in the case of the ring 16, or by internal and external circumferential ribs 18 in the case of the ring 16.

The ring 16, at the spigot end, is provided with a smooth circumferential outer surface 20 between the exposed end of the ring and the embedded flange 18 on the outer surface of such ring. The diameter of this surface 20 is less than the diameter 21 of the inner surface of the smallest part of the projecting portion of the ring 15, so that the ring 15 of one section may slide over the ring 16 of the adjacent section with sufficient clearance between the surfaces 20 and 21. The ring 15 has a conical internal flaring surface joining the outer end of the cylindrical surface 21, to provide a conical or tapered shoulder, and this conical surface 22 at its outer end joins with an internal cylindrical surface 23, all these surfaces 21, 22, and 23 being internal surfaces on the ring 15. At its outer end the ring 15 is provided with an outwardly projecting flange 24, embedded except on its face toward the adjacent pipe section. This flange 24 is provided with openings 25 lying close to the inside of said flange, and through these openings 25 project bolts 26, the heads 27 of which are embedded in concrete and bear against the outer surface of the ring 15 close to the flange 24 and are thus prevented from turning. The shanks of these bolts project toward the adjacent pipe section, and extend very loosely through holes 28 in pressure toes 29 which at their outer edge bear against the flange 24 and at their inner ends bear against a clamping ring 30 which by the tightening of the nuts 31 on the bolts 26 and the resultant tilting of the pressure toes 29 is forced into the recess between the surfaces 20 and 23 to compress a packing ring 32, conveniently formed of lead piping. By thus forcing the ring 33 in to compress the packing ring 32, the latter is forced into the tapered space between the surface 22 and the outer surface 20 of the ring 16, which makes a very effective fluid-tight joint while yet permitting any necessary longitudinal movements between the ring 16 and the packing ring 32.

When two sections have been put together and the ring 32 of the joint between them compressed by the tightening of the nut 31, the pressure toes and nuts 31 are embedded in a cement filling 34. Before this embedment, however, the holes 28 are filled with a suitable grease, and the shanks of the bolts 26 are covered with this grease. This may be done after the parts are tightened, but the holes 28 are filled with grease before the pressure toes are put on the bolts. This prevents rusting of the threads, so that if for any reason it becomes necessary to open the joint, after first chipping out the cement filling 24, it will be possible to move the nuts 31.

I claim as my invention:

1. In a concrete pipe, an embedded metal bell having a spigot-receiving portion which is internally tapered to provide a tapered packing-receiving shoulder, an end flange, clamping bolts projecting outwardly through said flange with their heads embedded in the concrete, a metal spigot embedded in the concrete formed with an exposed outer cylindrical surface which may be received in the spigot-receiving portion of an adjacent bell, and a metal packing-engaging ring arranged around the spigot and adjacent the packing-receiving surface and arranged to be clamped against the packing by said bolts to force the packing into the tapered opening between the outer surfaces of the spigot and the tapered inner surface of the bell.

2. In a concrete pipe, an embedded metal bell having a spigot-receiving portion which is internally tapered to provide a tapered packing-receiving shoulder, an end flange, clamping bolts projecting outwardly through said flange, a metal spigot embedded in the concrete formed with an exposed outer cylindrical surface which may be received in the spigot-receiving portion of an adjacent bell, and a metal packing-engaging ring arranged around the spigot end adjacent the packing-receiving surface and arranged to be clamped against the packing by said bolts to force the packing into the tapered opening between the outer surfaces of the spigot and the tapered inner surface of the bell.

3. In a concrete pipe, an embedded metal bell having a spigot-receiving portion which is internally tapered to provide a tapered packing-receiving shoulder, an end flange, clamping bolts projecting outwardly through said flange, a metal spigot embedded in the concrete formed with an exposed outer cylindrical surface which may be received in the spigot-receiving portion of an adjacent bell, a metal packing-engaging ring arranged around the spigot end adjacent the packing-receiving surface, and pressure toes through which said bolts project so that the pressure toes are tilted by the action of nuts coöperating with said bolts, said pressure toes bearing against said end flange and against said packing-engaging ring on opposite sides of said bolts.

4. In a concrete pipe, an embedded metal bell having a spigot-receiving portion, said portion being provided with a packing-receiving shoulder, an end flange, clamping bolts projecting outwardly through said flange, a metal spigot embedded in the concrete formed with an exposed outer cylindrical surface which may be received in the spigot-receiving portion of an adjacent bell, a metal packing-engaging ring arranged around the spigot end adjacent the packing-receiving surface, and pressure toes through which said bolts project so that the pressure toes are tilted by the action of nuts coöperating with said bolts, said pressure toes bearing against said end flange and against said packing-engaging ring on opposite sides of said bolts, the openings in said pressure toes being filled with grease.

5. A concrete pipe structure comprising an embedded metal bell having an internal exposed tapered packing-receiving shoulder, a spigot which may be received within said bell, a packing-engaging ring surrounding said spigot, and pressure means between said bell and said ring for forcing said ring toward said tapered shoulder to clamp a packing ring between the outer faces of the spigot and the tapered shoulder.

In witness whereof, I, COLEMAN MERIWETHER, have hereunto set my hand at Louisville, Kentucky, this eighth day of March, A. D., one thousand nine hundred and twenty-one.

COLEMAN MERIWETHER.

Witnesses:
J. B. OHLIGSCHLAGER,
E. RICHARDSON.